United States Patent [19]

Asprey et al.

[11] 3,929,601

[45] Dec. 30, 1975

[54] SYNTHESIS OF PENTAFLUORIDES

[75] Inventors: Larned B. Asprey; Robert T. Paine, Jr., both of Los Alamos, N. Mex.

[73] Assignee: The United States of America as represented by the United States Energy Research and Development Administration, Washington, D.C.

[22] Filed: Mar. 26, 1974

[21] Appl. No.: 454,983

[52] U.S. Cl................................... 204/157.1 R
[51] Int. Cl.$^2$............................................. B01J 1/10
[58] Field of Search..204/157.1 R, DIG. 11, 157.1 H

[56] References Cited
UNITED STATES PATENTS
3,127,334    3/1964    Heffels.................. 204/157.1 R Primary Examiner—Howard S. Williams
Attorney, Agent, or Firm—Dean E. Carlson; Paul D. Gaetjens

[57] ABSTRACT

The reactions of uranium, molybdenum, rhenium, osmium and iridium hexafluorides with hydrogen gas in the presence of ultraviolet radiation or with silicon powder in an anhydrous HF slurry provide especially useful, high yield syntheses of pure pentafluorides.

6 Claims, No Drawings

SYNTHESIS OF PENTAFLUORIDES

BACKGROUND OF THE INVENTION

None of the several methods reported in the prior art for the preparation of uranium pentafluoride are entirely satisfactory for producing very pure $UF_5$. The method of partial fluorination of "high surface area" $UF_4$ at low temperatures with gaseous fluorine has been used. Heating $UF_6$ and $UF_4$ together to yield $UF_5$ has also been used. These two syntheses suffer from the fact that the methods used in the preparation of the $UF_4$ affects its reactivity, and really pure $UF_5$ from these methods is not readily obtainable. A number of new approaches have been tried. Fluorination of $UF_4$ in anhydrous HF yields reasonably pure material as does oxidation of $UF_4$ by $UF_6$ also in liquid HF. However, both of these methods leave impurities arising from incomplete oxidation of $UF_4$ or other impurities originally present in the $UF_4$. Since $UF_6$ is easily obtainable and can be readily sublimed at room temperature (v.p. ≈ 125 mm), reduction of this should yield $UF_5$ of high purity providing the reduction does not go beyond $UF_5$. A method using silicon metal as a reductant with excess $UF_6$ yields a pure product but the reaction is very slow, circa several days for a few grams. Photolytic reduction of $UF_6$ using a mercury lamp does yield some $UF_5$ but very inefficiently and in small yield.

SUMMARY OF THE INVENTION

The reduction of uranium, molybdenum, rhenium, osmium and iridium hexafluorides with one equivalent of hydrogen gas in the presence of ultraviolet light from a mercury lamp gives the pentafluoride in excellent purity and is essentially 100% yield. In the reduction of molybdenum, rhenium, osmium and iridium hexafluorides, the rate of reduction is substantially increased in the presence of platinum gauze. The pentafluorides can be freed from the HF produced in the reaction by pumping and condensation of the HF.

DESCRIPTION OF THE PREFERRED EMBODIMENTS

Uranium hexafluoride is reacted with hydrogen gas at room temperature in a 30 ml Kel-F tube:

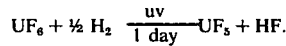

The reaction rate is greatly enhanced by radiation from a low pressure mercury lamp. One gram of $UF_6$ is completely converted to pure $\beta$-$UF_5$ powder in one day, and the HF produced is easily removed by pumping.

In a second embodiment, $UF_6$ reacts at room temperature with silicon powder in a stirred anhydrous HF slurry contained in a Kel-F tube according to the reaction:

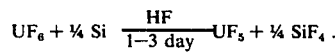

The $UF_5$ is virtually insoluble in the anhydrous HF, and the $SiF_4$ and HF are removed by pumping. One gram of $UF_6$ is completely converted to pure $\beta$-$UF_5$ powder in 2-3 days. Working in a dry box, the free-flowing $\beta$-$UF_5$, ranging in color from white to yellow-green, is easily recovered from the reaction tubes. Identification is provided by the infrared spectrum of a powder sample held at −196° (cm$^{-1}$): 623 s,sh, 567 s, 508 s, 405 s, 405 s, sh; and the Raman spectrum of a powder sample held at 23° ($\Delta\nu$ cm$^{-1}$); 623 s, 610 s, 280 m. All attempts to evaporate $UF_5$ from a resistively heated crucible into the ion source of a TOF mass spectrometer resulted in disproportionation of the $UF_5$ as evidenced by the resulting mass spectrum of $UF_6$. The $\beta$-$UF_5$ obtained from the above reactions is converted to a $\alpha$-$UF_5$ at ca. 120°, and the $\alpha$-$UF_5$ was identified by x-ray powder diffraction. Attempts were made to carry the chemical reduction from $UF_6$ to $UF_4$ by adding additional $H_2$ or Si, but no evidence for reduction below $UF_5$ was obtained.

At present, the mechanism of the silicon reduction of $UF_6$ is not clearly understood, however, we have shown that the production of hydrogen from the reaction of liquid, anhydrous HF and silicon metal is slow compared to the uranium hexafluoride reduction.

A. Molybdenum Pentafluoride

The one electron reduction reaction of $MoF_6$ with silicon and $H_2$ has been investigated. The former reaction in anhydrous HF proceeded rapidly to completion in 1-2 hours in the presence of platinum gauze. The resulting yellow sublimable solid was characterized by power x-ray diffraction, infrared and Raman spectroscopy and melting point. The data require that the product be $MoF_5$. The reaction of $MoF_6$ with $H_2$ was slow and required irradiation with ultraviolet light. After 3-5 days a good yield of $MoF_5$ was obtained.

The reaction of $MoF_6$ with two equivalents of Si metal in HF solution produced a green oil. The oil has been partially characterized and appears to be $MoF_4$.

B. Rhenium Pentafluoride

We find that the known reduction of $ReF_6$ to $ReF_5$ by $W(CO)_6$ gives very poor yields and a complex product mixture. On the other hand, we discovered that $ReF_6$ reacts with one equivalent of silicon (4 $ReF_6$/Si) in anhydrous HF solution to give better than 80% yields of a green, sublimable solid established now as $ReF_5$ by chemical analysis, melting point, and sublimation temperature.

The reduction of rhenium hexafluoride with one equivalent of hydrogen gas using ultraviolet light in the presence of platinum gauze gave essentially 100% yields of rhenium pentafluoride of excellent purity. The compound was characterized by chemical analysis, melting point and sublimation temperature.

C. Osmium Pentafluoride $OsF_6$ reacts with one equivalent of Si (4$OsF_6$/Si) in anhydrous HF solution to give better than 90 % yields of $OsF_5$, a yellow-brown solid. The reduction of $OsF_6$ with one equivalent of hydrogen using ultraviolet light in the presence of platinum gauze also gave $OsF_5$ in high yield and excellent purity. The osmium pentafluoride was characterized by chemical analysis, mass spectroscopy, x-ray and infrared.

D. Iridium Pentafluoride

The one electron reduction reaction of $IrF_6$ with both silicon metal and with $H_2$ has been investigated. The former reaction in HF proceeded rapidly to completion in 1-2 hours in the presence of platinum gauze. The product is a yellow sublimable solid which has been characterized by powder x-ray diffraction, infrared and Raman spectroscopy and melting point. The data are consistent with the compound being $IrF_5$.

The convenient high-yield reduction reactions described here appear to be general. To date, we have obtained high yields of the pure pentafluorides of molybdenum, rhenium, osmium, and iridium from the corresponding hexafluorides.

What we claim is:

1. A method of preparing pure pentafluorides comprising reacting at least one of the hexafluorides selected from the class consisting of, molybdenum, rhenium, osmium, and iridium hexafluoride, with one equivalent of hydrogen gas in the presence of ultraviolet radiation, at room temperature and for a period of about one day.

2. The method of claim 1 in which the said hexafluoride is reacted in the presence of platinum gauze.

3. The method of claim 2 in which the said hexafluoride is rhenium hexafluoride.

4. The method of claim 2 in which the said hexafluoride is iridium hexafluoride.

5. The method of claim 2 in which the said hexafluoride is osmium hexafluoride.

6. The method of claim 2 in which the said hexafluoride is molybdenum hexafluoride.

* * * * *